United States Patent
Freudenberger et al.

(10) Patent No.: US 10,169,282 B2
(45) Date of Patent: *Jan. 1, 2019

(54) BUS SERIALIZATION FOR DEVICES WITHOUT MULTI-DEVICE SUPPORT

(71) Applicant: International Business Machines Corporation, Armonk, NY (US)

(72) Inventors: Harald Freudenberger, Fellbach (DE); Thomas Hess, Bad Liebenzell (DE); Martin Raitza, Boeblingen (DE); Philip S. Schulz, Stuttgart (DE); Markus Strasser, Metzingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/643,596

(22) Filed: Jul. 7, 2017

(65) Prior Publication Data

US 2017/0315955 A1  Nov. 2, 2017

Related U.S. Application Data

(63) Continuation of application No. 14/576,559, filed on Dec. 19, 2014, now Pat. No. 9,740,658, which is a
(Continued)

(51) Int. Cl.
*G06F 13/42* (2006.01)
*G06F 13/40* (2006.01)
*G06F 13/364* (2006.01)

(52) U.S. Cl.
CPC ........ *G06F 13/4022* (2013.01); *G06F 13/364* (2013.01); *G06F 13/404* (2013.01); *G06F 13/4282* (2013.01); *G06F 13/4291* (2013.01)

(58) Field of Classification Search
CPC ............ G06F 13/4022; G06F 13/4291; G06F 13/4282
See application file for complete search history.

(56) References Cited

U.S. PATENT DOCUMENTS 6,145,036 A  11/2000  Barenys et al.
6,233,635 B1  5/2001  Son
(Continued)

OTHER PUBLICATIONS

Leens, Frédéric, "An Introduction to I2C and SPI Protocols", IEEE Instrumentation & Measurement Magazine, 1094-6969/09 © 2009 IEEE, Feb. 2009.

(Continued)

*Primary Examiner* — Brian T Misiura
(74) *Attorney, Agent, or Firm* — David B. Woycechowsky

(57) ABSTRACT

A serial bus is provided with a device (sometimes herein referred to as an I2C serializer device) including circuitry and machine logic that operates as follows: when one of the master devices is using the bus for data communication, then the other master(s) will receive a wait signal until the bus becomes available again. This wait signal allows the master devices to wait as a "hardware response," rather than requiring the master devices to be equipped with software and/or firmware to control the operation of waiting until the serial bus is available. In some embodiments, the use of the I2C serializer device allows a bus operating under a bus serialization protocol (for example, I2C) to be simultaneously connected to multiple master devices even in the case that one, or more, master device(s) do not include any currently conventional form of multi-master support.

2 Claims, 3 Drawing Sheets

Related U.S. Application Data continuation of application No. 14/548,461, filed on Nov. 20, 2014, now Pat. No. 9,665,528.

(56) References Cited

U.S. PATENT DOCUMENTS

| | | | |
|---|---|---|---|
| 7,039,734 B2 | 5/2006 | Sun et al. | |
| 7,092,041 B2 | 8/2006 | Lendaro | |
| 7,117,283 B2 | 10/2006 | Trembley | |
| 7,281,070 B2 | 10/2007 | Bomhoff et al. | |
| 7,284,079 B2 | 10/2007 | Ervin | |
| 7,398,345 B2 | 7/2008 | Larson et al. | |
| 7,676,622 B2 | 3/2010 | Naderi et al. | |
| 7,818,604 B2 | 10/2010 | Saripalli et al. | |
| 7,840,734 B2 | 11/2010 | Murfett et al. | |
| 7,882,290 B2 | 2/2011 | Lin | |
| 8,274,972 B2 | 9/2012 | Park | |
| 8,521,932 B2 | 8/2013 | Wu et al. | |
| 8,626,973 B2 | 1/2014 | Austen et al. | |
| 8,799,708 B2 * | 8/2014 | Kojina | G06F 13/4282 714/11 |
| 9,665,528 B2 | 5/2017 | Freudenberger et al. | |
| 9,710,423 B2 | 7/2017 | Sengoku | |
| 2011/0087812 A1 | 4/2011 | Marten et al. | |
| 2012/0331194 A1 | 12/2012 | Crumlin | |
| 2016/0147707 A1 | 5/2016 | Freudenberger et al. | |
| 2017/0177531 A1 | 6/2017 | Freudenberger et al. | |

OTHER PUBLICATIONS

List of IBM Patents and Patent Applications Treated as Related, Filed Jul. 7, 2017, 2 pages.

* cited by examiner

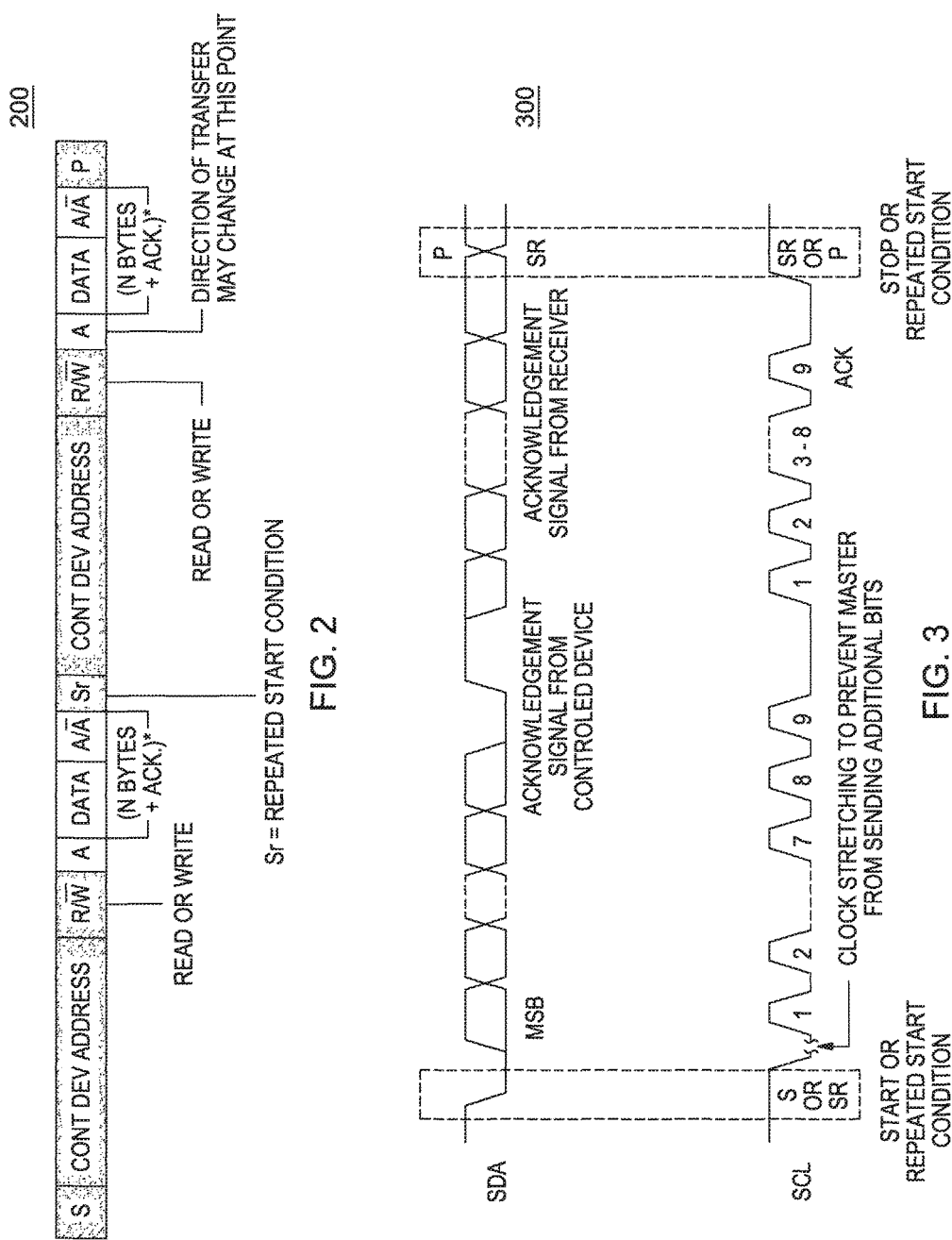

BUS SERIALIZATION FOR DEVICES WITHOUT MULTI-DEVICE SUPPORT

BACKGROUND OF THE INVENTION

The present invention relates generally to the field of digital data communication buses, and more particularly to I2C (Inter-Integrated Circuit, commonly pronounced I-squared-C) buses used in systems where at least one of the master devices does not have multi-master support.

I2C is a multi-master serial bus typically used for attaching low-speed peripherals to a motherboard, embedded system, cellphone and/or other digital electronic devices. SMBus is a subset of I2C that has more restrictive protocols to promote robustness and interoperability. Some I2C systems incorporate policies and rules from SMBus, sometimes supporting both I2C and SMBus, and requiring only minimal reconfiguration. Herein, I2C, SMBus and other similar sets of bus-related protocols will be collectively referred to as bus serialization protocols (BSPs). Conventional I2C protocol buses include the following components: (i) a serial data line (SDA); (ii) a serial clock line (SCL); (iii) a positive voltage terminal at potential Vdd; (iv) a pull-up resistor connected between the Vdd terminal and SCL; (v) a pull-up resistor connected between the Vdd terminal and SDA; and (vi) a voltage terminal at ground (GND).

Conventionally, the use of two, or more, master devices on an I2C protocol bus requires conventional multi-master support circuitry, as will be understood by those of skill in the art. Conventional multi-master support includes arbitration and "clock synchronization." Conventionally I2C buses with more than one I2C master device use multi master I2C master devices which include a dedicated controller module (see definition of "module," below, in the Definitions sub-section of the Detailed Description section). Under currently conventional technology, if a I2C bus has more than one I2C master device, and at least one of these master devices does not provide multi master capability, then there will typically be a mechanism (for example, separate "bus busy" or "bus request" lines) for bus arbitration.

Under official I2C specifications, controlled devices are referred to as "slave devices." However, in order to avoid unintentionally offending any readers, this document will refer to I2C controlled devices as "controlled devices."

SUMMARY

According to an aspect of the present invention, a bus serializer device is provided for use with a bus system. The bus system includes a first master device, a second master device, a set of controlled device(s) including at least a first controlled device, a set of bus communication line(s) including at least a first communication line with the set of bus communication lines being connected in data communication with each controlled device of the set of controlled device(s). The bus serializer device includes: (i) a control unit including machine logic; (ii) a first communication hardware set; and (iii) a second communication hardware set. The first communication hardware set is structured, connected, located and/or programmed to provide data communication between the first master device and the set of controlled device(s) through the set of bus communication line(s). A second communication hardware set is structured, connected, located and/or programmed to provide data communication between the second master device and the set of controlled device(s) through the set of bus communication line(s). The machine logic of the control unit is structured and/or programmed to: (i) during the pendency of a communication session, between the first master device and the set of controlled device(s) through the first communication hardware set, to send a first signal to the second master device to cause the second master device to suspend, as a hardware response, any communication with the set of controlled device(s), and (ii) during the pendency of a communication session, between the second master device and the set of controlled device(s) through the second communication hardware set, to send a second signal to the first master device to cause the first master device to suspend, as a hardware response, any communication with the set of controlled device(s).

According to a further aspect of the present invention, a bus system includes: (i) a first master device; (ii) a second master device; (iii) a set of controlled device(s) including at least a first controlled device, (iv) a set of bus communication line(s) including at least a first communication line with the set of bus communication lines being connected in data communication with each controlled device of the set of controlled device(s); and (v) a bus serializer device. The bus serializer device includes: (a) a control unit including machine logic, (b) a first communication hardware set, and (c) a second communication hardware set. The first communication hardware set is structured, connected, located and/or programmed to provide data communication between the first master device and the set of controlled device(s) through the set of bus communication line(s). The second communication hardware set is structured, connected, located and/or programmed to provide data communication between the second master device and the set of controlled device(s) through the set of bus communication line(s). The machine logic of the control unit is structured and/or programmed to: (i) during the pendency of a communication session, between the first master device and the set of controlled device(s) through the first communication hardware set, to send a first signal to the second master device to cause the second master device to suspend, as a hardware response, any communication with the set of controlled device(s), and (ii) during the pendency of a communication session, between the second master device and the set of controlled device(s) through the second communication hardware set, to send a second signal to the first master device to cause the first master device to suspend, as a hardware response, any communication with the set of controlled device(s).

According to a further aspect of the present invention, a method includes the following steps (not necessarily in the following order): (i) providing, by a first communication hardware set, data communication between a first master device and a set of controlled device(s) through a set of bus communication line(s); (ii) providing, by a second communication hardware set, data communication between the second master device and the set of controlled device(s) through the set of bus communication line(s); (iii) during the pendency of a communication session, between the first master device and the set of controlled device(s) through the first communication hardware set, sending, by a control unit, a first signal to the second master device to cause the second master device to suspend, as a hardware response, any communication with the set of controlled device(s); and (iv) during the pendency of a communication session, between the second master device and the set of controlled device(s) through the second communication hardware set, sending, by the control unit, a second signal to the first master device to cause the first master device to suspend, as a hardware response, any communication with the set of controlled device(s).

BRIEF DESCRIPTION OF THE DRAWINGS

FIG. 2 is a diagram helpful in understanding certain operations of the first embodiment system; and FIG. 3 is a diagram helpful in understanding certain operations of the first embodiment system.

DETAILED DESCRIPTION

In some embodiments of the present invention, a serial bus is provided with a device (sometimes herein referred to as an I2C serializer device) including circuitry and machine logic that operates as follows: when one of the master devices is using the bus to make a data communication, and the other master(s) wants to start a data communication too, then the master(s) starting the communication will receive a wait signal until the bus again becomes available. This wait signal allows the master devices to wait as a "hardware response," rather than requiring the master devices to be equipped with software and/or firmware to control the operation of waiting until the serial bus is available. In some embodiments, the use of the I2C serializer device allows a bus operating under a BSP (for example, I2C) to be connected to multiple master devices even in the case that at least one of them has no multi-master support.

Some embodiments of the present invention may include one, or more, of the following features, characteristics and/or advantages: (i) provide a solution which allows at least two I2C master devices (while at least one has no conventional multi-master support, for example: software I2C engines) to access an I2C "controlled device" without collisions; (ii) transparent to all I2C master devices (that is, no additional code (that is, software and/or firmware) on I2C master device for switching is necessary); and/or (iii) recovers an I2C transaction hang (that is, hang that occurs when the SCL is not toggled for a predetermined time).

Figure 1A:
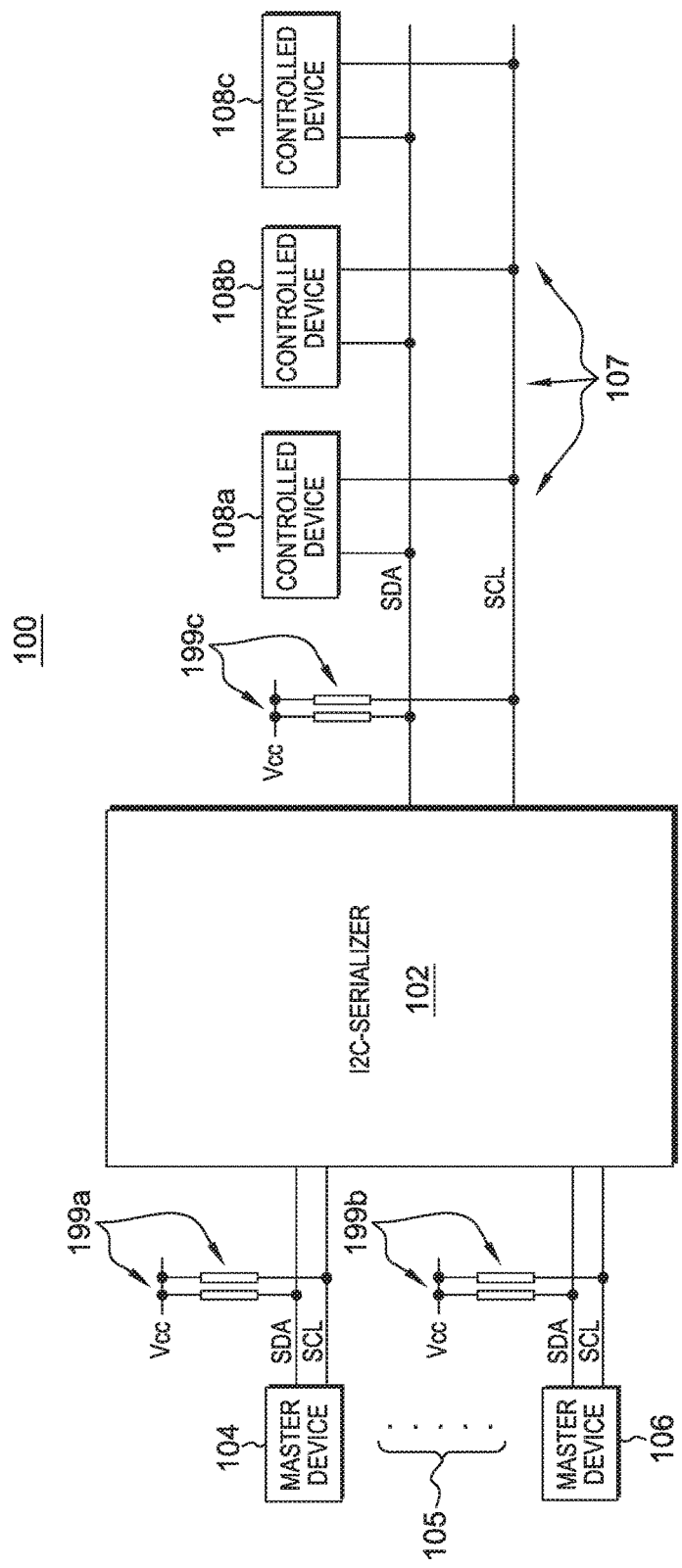
FIGS. 1A and 1B are block diagram views of a first embodiment of a system according to the present invention.
Figure 1B:
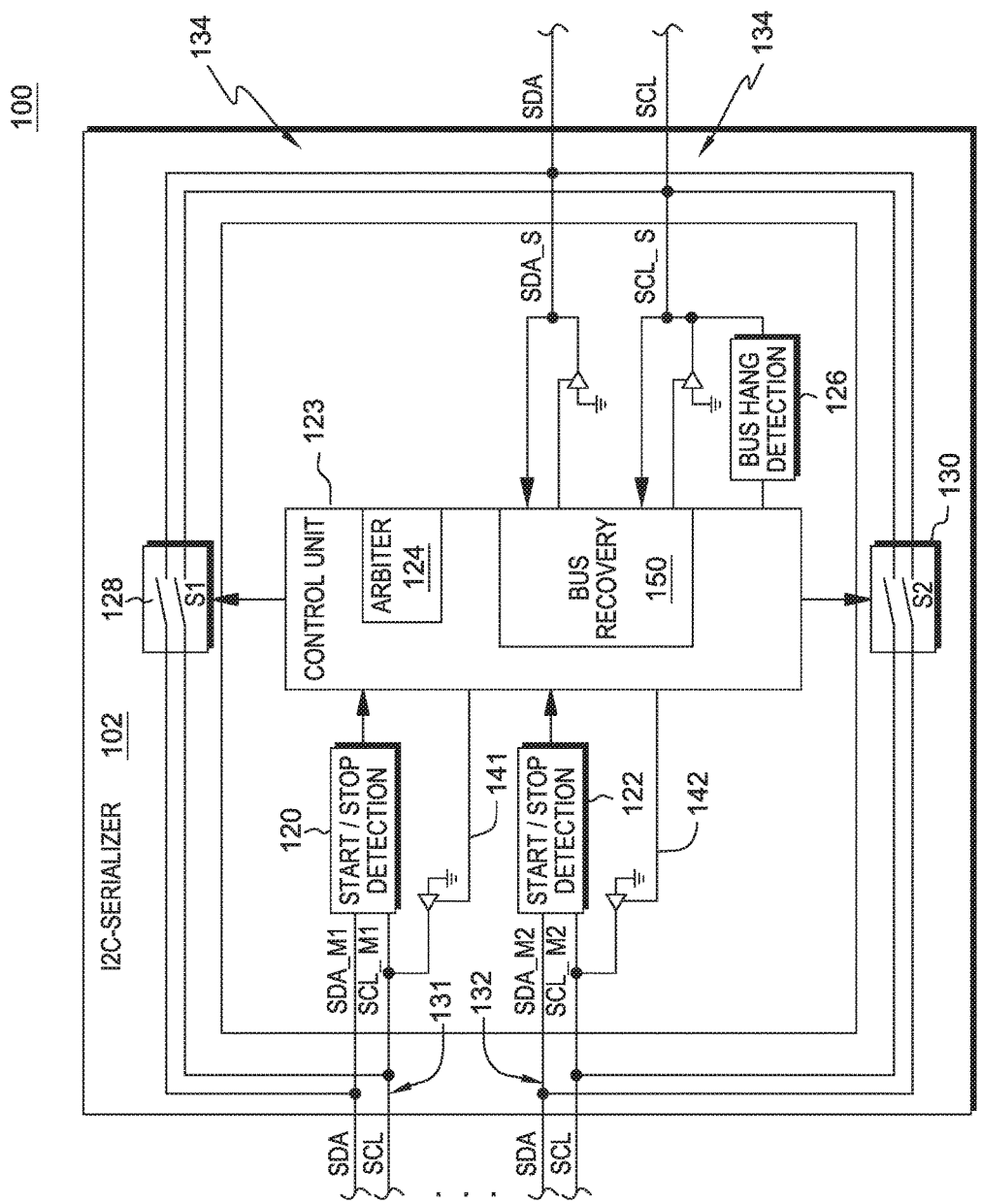

As shown in FIGS. 1A and 1B, I2C bus system 100 includes: I2C serializer device 102; master device 104; additional master devices 105 (not shown in detail); master device 106; I2C bus communication line hardware 107; controlled devices 108a, b, c; data communication line SDA; clock communication line SCL; and bus voltage conditioning hardware 199a, b, c. Device 102 includes: start stop detection circuitry (also sometimes referred to as start/stop condition block) 120; start stop detection circuitry 122; control unit 123 (which includes bus arbiter (or, more simply, arbiter) 124); bus hang detection circuitry 126; switch 128; switch 130; serializer-master communication hardware set 131 and 132; controlled-bus communication hardware set 134; and bus recovery module 150.

Start/Stop condition block 120, 122: detects a start or stop condition of the connected master device and delivers this information to the control unit.

Arbiter 124: includes machine logic that defines the policy which I2C master gets the connection to the I2C controlled devices in case more than one master wants to access the controlled devices at exactly the same time. A simple policy is to implement a hardwired priority (for example, always master 1 before master 2, master 2 before master 3, and so on). In this embodiment arbiter 124 is part of control unit 123.

Switch 128, 130: are controlled by the control unit 123 and each switch connects an I2C master to the I2C controlled device bus.

Bus Hang Detection Circuitry 126: notifies control unit 123 in case the SCL line of the controlled device bus is not toggled for a predetermined time interval while a switch 128, 130 is closed. This lack of toggling indicates that a bus hang condition likely exists.

Bus Recovery Module 150: is started by control unit 123 to bring the I2C controlled device bus in its inactive state and takes care that no controlled device is addressed any more. While running bus recovery processes controlled by bus recovery module 150, all switches 128, 130 should be off. Bus recovery is used in case an I2C transaction was not finished (interrupted). Recovery is to toggle the clock line up to nine times until the SDA line goes high and a stop condition can be issued.

Control Unit 123: depending on the information of the other functional blocks, control unit 123 includes machine logic to control switches 128, 130 so that at least one switch is closed in case several masters want to access the controlled device bus. It can force the SCL lines to low-level (using the control lines 141, 142) for each master device separately (clock stretching) to signal that the I2C controlled device bus is busy and the master device has to wait. Control unit 123 further includes machine logic to process the information from arbiter 124 to control the order in case multiple master devices 104, 105, 106 want to access the I2C controlled device bus. Control unit 123 further includes machine logic to instruct the bus recovery module 150 to clean up the I2C controlled device bus.

Bus voltage conditioning hardware 199a, b, c: conditions the voltages on the various bus lines using voltage Vcc, as shown in FIG. 1A.

Now that a brief description of operations of some portions have been briefly discussed in the preceding paragraphs, further explanation of the operation of system 100 will be given in the following paragraphs.

In this embodiment, I2C bus serializer device 102 is transparent to both the master devices 104, 106 and salve devices 108a, b, c. No special setup is needed, in I2C master devices 104, 106, in order to access controlled device 108a, b, c. The I2C serializer can be in hardware or software and the switch can be any component (relay, transistor, FET, . . . ) which allows to open or close the connection between a master and the controlled devices.

An example operation of system 100 will now be explained in greater detail for a simple case, with only single access. In this example: (i) master device 104 has data ready to communicate over the I2C bus 131 (that is, the SDA/SCL communication lines) and sends a start condition which is a high to low transition on SDA while SCL is high; (ii) because master device 106 is not currently communicating over the SDA and SCL communication lines 132/134 with controlled device 108a, b, c, control unit 123 closes switch 128, thereby causing controlled devices 108a, b, c to receive the "start condition" (that is, a signal indicating that conditions are appropriate to start) through SDA/SCL communication line 131/134; (iii) next, master device 104 communicates with one or more of controlled devices 108a, b, c in the conventional manner until master device 104 terminates its communication session by sending a stop condition over the SDA/SCL communication line (in this embodiment, the stop condition is a low to high transition on SDA while SCL is high); and (iv) in response to the stop condition, control unit 123 opens switch 128 back up so that signals may no longer be connected between master device 104 and the controlled device 108a, b, c. As will be appreciated by those of skill in the art, similar operations are performed when master device 106 communicates over the SDA and SCL with controlled devices 108a, b, c, except, switch 130 is closed and opened, instead of switch 128.

Example operations of system 100 will now be explained for a "bus busy" case, where two master devices 104, 106 access one of the controlled devices 108a, b, c. In the example method of the following paragraph, master device 106 wants to access controlled device 108b while there is already an ongoing, pending communication session between master device 104 and controlled device 108a.

Bus busy case example method: (i) master device 104 sends a start condition; (ii) because master device 106 is not currently accessing the bus, control unit 123 of I2C serializer device 102 closes switch 128, and, in response, controlled devices 108a, b, c receive and recognize the start condition; (iii) after the start condition, master device 104 sends an I2C device address and data to controlled device 108a according to the currently conventional I2C protocol; (iv) while master device 104 is communicating data to controlled device 108a over bus SCL/SDA 131, 134, the other master device 106 becomes ready to communicate with controlled device 108b, and, therefore prepares to send its own start condition (at this operational juncture, switch 130 is open, while switch 128 is closed); (v) master device 106 pulls its SCL line too low to transmit the first bit of the controlled device address (intended for controlled device 108b); (vi) in response to the previous operational step, control unit 123 of I2C serializer 102 pulls the clock line (SCL) of master device 106 also to low (this is called clock stretching) so this prevents master device 106 from transmitting further data; (vii) after master device 104 has finished its data transfer to controlled device 108a, it will terminate the I2C transaction with a stop condition which is received by I2C serializer 102 and controlled devices 108a, b, c; (viii) in response to the stop condition, control unit 123 of I2C serializer 102: (a) detects the stop condition and opens switch 128, (b) arbiter 124 indicates to control unit 123 which master device is next in order to conduct a communication session with controlled devices 108 a, b, c (this order depends on a policy determined by machine logic of the system), (c) control unit 123 generates a new start condition for controlled device 108a, b, c on behalf of master device 106, (d) control unit 123 closes second switch 130, and (e) control unit 123 releases the SCL line to master device 106, so it can access the controlled devices 108a, b, c; (x) master device 106 sends controlled device address to address controlled device 108b followed by the data bytes; (xi) after master device 106 has finished its data transfer it will send its own stop condition; and (xii) the stop condition of master device 106 is recognized by the controlled devices 108a, b, c and control unit 123 of I2C serializer 102, which responsively opens switch 130 back up.

The "clock stretching" of step (vi), of the operational steps set forth in the previous paragraph, is shown graphically at signal graph 300 of FIG. 3. This "clock stretching" is considered as a hardware response (as opposed to a software or firmware response). More specifically, the clock stretching is used directly after the start bit, when the master device has switched the SCL line to low.

Three examples of bus hang/bus recovery operations, as performed on system 100 of FIG. 1, will be discussed, respectively, in the following three paragraphs.

One type of bus hang is caused when a master device 104, 106 is set into reset state while running an I2C write transaction. If a write transfer within a byte is interrupted, then care must be taken that the receiving controlled device 108a, b, c does not use the incomplete byte. Bus recovery module 150 of control unit 123 of I2C serializer 102 handles this type of bus hang by performing a bus recovery operation that terminates the transfer with a stop condition before all bits of the interrupted byte are transferred.

Another type of bus hang is caused when a master device 104, 106 is set into a reset state while running an I2C read transaction. If a read transfer within a byte is interrupted, then a controlled device 108a, b, c can pull the SDA line to low, because of transmitting a "0" bit. This is sometimes referred to herein as a "stuck SDA line." Bus recovery module 150 of control unit 123 of I2C serializer 102 handles this type of bus hang by: (i) sending up to nine (9) clock pulses on the SCL line until the SDA on controlled-bus communication hardware set 134 is released; and (ii) sending a stop condition if the SDA is in a high state.

Another type of bus hang is caused when a master device 104, 106 is set into a reset state while setting up an I2C read operation (between writing offset to a controlled device 108a, b, c and setting up the read operation in the I2C master engine). An associated recovery, according to an embodiment of the present invention, is shown in diagram 200 of FIG. 2, where the shaded (and/or cross-hatched) blocks indicate that the transfer direction of data and acknowledge bits depends on R/W (read/write) bits.

Some embodiments of the present invention may include one, or more, of the following features, characteristics and/or advantages: (i) solution works on bit level and not on data bytes (8 bit+ACK) or transactions (bytes surrounded by start/stop condition); (ii) use clock stretching to stop starting I2C activity while I2C bus is used from other master; (iii) provide bus recovery (used to recover from I2C bus errors or interrupted bus transfer); and/or (iv) provide bus hang detection (SCL line is not toggled for a specified time which results in a timeout—this unlinks the corrupted path and recovers the I2C bus to the appropriate controlled device).

Some embodiments of the present invention may include one, or more, of the following features, characteristics and/or advantages: (i) each device, of a set of master devices, communicates with various controlled devices, of a set of controlled device(s) by a two wire packet-oriented bus; (ii) the bus wires, of the bus, are bi-directional with a first bus wire communicating bus data and a second bus wire communicating clock pulses; (iii) dedicated start and stop conditions define the beginning and the end of a data transmission (between a master device and a controlled device) on the bus; (iv) a bus serializer is connected via the bus between the master devices and the controlled devices; (v) the bus serializer includes dedicated switches for each of the master devices, with each switch being connected between the master device and the set of controlled device(s); (vi) the bus serializer includes a control unit for controlling the switches; (vii) the arbitration device includes machine logic defining a policy by which the communication order of master devices is determined (in the case that multiple master devices are attempting to use the communication bus at the same time); (viii) the bus serializer device includes start/stop detection hardware to detect the start and the end of a data transmission of a master device; (ix) the bus serializer device includes signaling hardware responsive to signals output by the start/stop detection hardware; (x) the control unit generates a wait signal on the bus to a master device; (xi) a wait signal is received by a master device which attempts to start a data transmission while another master device is connected to the set of controlled devices; and/or (xii) the wait signal allows the master devices to react completely in their respective hardware instead requiring machine logic in the form of firmware and/or software to control timing of transmissions vis-à-vis other master device(s) sharing the same bus.

Some embodiments of the present invention may include one, or more, of the following features, characteristics and/or advantages: (i) bus connection hardware to connect in data communication the master devices to the control unit; (ii) a bus hang detection machine logic set to detect a hang condition for the bus; (iii) a bus recovery machine logic set that, responsive to signals from the bus hang detection machine logic set, performs a bus recovery for the currently connected controlled device by (a) creating clock pulse signals until a data high level signal is received, and (b) generating a bus stop condition in response to receiving a data high level signal; and/or (iv) missing clock level changes (from low to high or high to low) within a given time will indicate a bus hang; and/or (v) the stop condition is a low-to-high transition on the respective first bus wire occurring while the second bus wire is at a high level.

The following paragraphs set forth definitions to be used in interpreting and understanding this document.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Electrically Connected: means either directly electrically connected, or indirectly electrically connected, such that intervening elements are present; in an indirect electrical connection, the intervening elements may include inductors and/or transformers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

What is claimed is:

1. A method comprising:
providing, by a first communication hardware set, data communication between a first master device and a set of controlled device(s) through a set of bus communication line(s);
providing, by a second communication hardware set, data communication between the second master device and the set of controlled device(s) through the set of bus communication line(s);
during the pendency of a communication session, between the first master device and the set of controlled device(s) through the first communication hardware set, sending, by a control unit, a first signal to the second master device to cause the second master device to suspend, as a hardware response, any communication with the set of controlled device(s); and
during the pendency of a communication session, between the second master device and the set of controlled device(s) through the second communication hardware set, sending, by the control unit, a second signal to the first master device to cause the first master device to suspend, as a hardware response, any communication with the set of controlled device(s);
wherein:
the set of bus communication line(s) includes a two line Inter-Integrated Circuit (I2C) bus;
the first signal is a clock stretching signal;
the second signal is a clock stretching signal; and
the first hardware communication set includes a first serializer-master communication hardware set, a first switch and a first controlled-bus communication hardware set.

2. A method comprising:
providing, by a first communication hardware set, data communication between a first master device and a set of controlled device(s) through a set of bus communication line(s);
providing, by a second communication hardware set, data communication between the second master device and the set of controlled device(s) through the set of bus communication line(s);
during the pendency of a communication session, between the first master device and the set of controlled device(s) through the first communication hardware set, sending, by a control unit, a first signal to the second master device to cause the second master device to suspend, as a hardware response, any communication with the set of controlled device(s); and
during the pendency of a communication session, between the second master device and the set of controlled device(s) through the second communication hardware set, sending, by the control unit, a second signal to the first master device to cause the first master device to suspend, as a hardware response, any communication with the set of controlled device(s);
wherein:
the set of bus communication line(s) includes a two line Inter-Integrated Circuit (I2C) bus,
the first signal is a clock stretching signal,
the second signal is a clock stretching signal,
the first hardware communication set includes a first serializer-master communication hardware set, a first switch and a first controlled-bus communication hardware set,
the second hardware communication set includes a second serializer-master communication hardware set, a second switch and a second controlled-bus communication hardware set,
a machine logic of the control unit is structured and/or programmed to:
selectively close the first switch to provide for a communication session between the first master device and the set of controlled device(s) through the set of bus communication line(s), and
selectively close the second switch to provide for a communication session between the second master device and the set of controlled device(s) through the set of bus communication line(s).

* * * * *